United States Patent
Zaidi et al.

(10) Patent No.: US 8,874,084 B2
(45) Date of Patent: Oct. 28, 2014

(54) APPARATUS AND METHOD FOR CONTROLLING WIRELESS NETWORK ACCESS

(75) Inventors: Saad Zaidi, San Diego, CA (US);
Ishwinder Singh, San Diego, CA (US);
Sivaramakrishna Veerepalli, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 43 days.

(21) Appl. No.: 13/316,401

(22) Filed: Dec. 9, 2011

(65) Prior Publication Data

US 2013/0149997 A1 Jun. 13, 2013

(51) Int. Cl.
*H04W 12/08* (2009.01)

(52) U.S. Cl.
USPC ............... 455/411; 455/410; 370/328

(58) Field of Classification Search
USPC ............ 455/411, 410; 380/247–250; 370/328
See application file for complete search history.

(56) References Cited

U.S. PATENT DOCUMENTS

| | | | |
|---|---|---|---|
| 6,400,939 B1 * | 6/2002 | Virtanen et al. ............... | 455/410 |
| 7,600,064 B2 | 10/2009 | Knowles et al. | |
| 2009/0093235 A1 | 4/2009 | Grealish et al. | |
| 2009/0131017 A1 | 5/2009 | Osborn | |
| 2010/0041373 A1 * | 2/2010 | Ramankutty et al. ......... | 455/411 |
| 2011/0122813 A1 * | 5/2011 | Choe et al. .................... | 370/328 |

FOREIGN PATENT DOCUMENTS

| | | |
|---|---|---|
| CN | 101945380 A | 1/2011 |
| WO | 9413115 A1 | 6/1994 |
| WO | 9859514 A2 | 12/1998 |
| WO | 2008110096 A1 | 9/2008 |
| WO | 2009078657 A2 | 6/2009 |

OTHER PUBLICATIONS

Crowe, D., et al., "MEID Standards Update", Apr. 2006, pp. 1-36, XP2690513, Retrieved from the Internet: URL: http://www.tiaonline.org/sites/default/files/pages/TIA-MEID_v184. pdf.
Crowe, "Migrating Network Elements to MEID and Expanded UIMID (E-UIMID) Version 3.5", Retrieved from http://www.cdg.org/devices/meid/MEID-EUIMID-Migration(CDG)v3.5.pdf, pp. 1-19, Nov. 2010.
Crowe, "Moving Forward on MEID and Expanded UIMID, Version 3.2.," Retrieved from http://www.cdg.org/devices/meid/MEIDUIMID%20Presentation(CDG)v3.2.pdf, pp. 1-55, See pp. 33, 37 and 41-49, May 2011.
International Search Report and Written Opinion—PCT/US2012/068830—ISA/EPO—Mar. 14, 2013.

(Continued)

*Primary Examiner* — Chuong A Ngo
(74) *Attorney, Agent, or Firm* — Abdollah Katbab

(57) ABSTRACT

Systems and methods for controlling access to a wireless network are provided. An access control device is configured to control access of a wireless device to the wireless network. The access control device includes a receiver configured to receive, from the wireless device, a first identifier. The first identifier has an identifier type. The access control device further includes a processor configured to select a database, from a first database and a second database, based on the identifier type. The processor is further configured to determine whether the first identifier is in the selected database. The processor is further configured to restrict access of the wireless device to the wireless network based on whether the first identifier is in the selected database.

48 Claims, 10 Drawing Sheets

(56) References Cited

OTHER PUBLICATIONS

Qualcomm: "CDMA Network Adjunct Workshop", Jan. 1, 2011, pp. 1-39, XP2690512, Retrieved from the Internet:URL:https://wiki.cdg.org/w/images/e/ed/OMHNetworkAdjunctWorkshop.pdf.

Sanyal, "Implementation of MEID for Mobile Stations in CDMA Network," Proceedings of the 3rd International Conference on Communication systems Software and middleware and Workshops, pp. 1-5, 2008.

* cited by examiner

APPARATUS AND METHOD FOR CONTROLLING WIRELESS NETWORK ACCESS

TECHNICAL FIELD

The present application relates generally to wireless communication, and more specifically to systems and methods to control wireless network access.

DESCRIPTION OF THE RELATED TECHNOLOGY

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

In general, GSM phone networks use an Equipment Identity Register (EIR) to determine whether a call should be blocked from accessing the network. GSM networks may determine whether to block the call by searching the EIR for a unique identifier, for example an International Mobile Equipment Identity (IMEI). When GSM equipment is lost or stolen, the owner can typically contact their local operator with a request that it should be blocked. The local operator may record the IMEI in the EIR as a blocked device. The operator may also communicate the blocked IMEI to the Central Equipment Identity Register (CEIR), which may blacklist the device in all other operator switches that use the CEIR. Accordingly, the device may become unusable on any GSM network that subscribes to the CEIR, discouraging theft of mobile equipment.

CDMA phone networks, on the other hand, do not typically have an equivalent mechanism. Moreover, CDMA user equipment can use a variety of different identifiers, including device identifiers and card/subscription identifiers. Accordingly, there is a need for systems and methods to control wireless network access, particularly in CDMA phone networks.

SUMMARY

The systems, methods and devices of the disclosure each have several innovative aspects, no single one of which is solely responsible for the desirable attributes disclosed herein.

In one aspect, an access control device is provided. The access control device is configured to control access of a wireless device to a wireless network. The access control device includes a receiver configured to receive, from the wireless device, a first identifier. The first identifier has an identifier type. The access control device further includes a processor configured to select a database, from a first database and a second database, based on the identifier type. The processor is further configured to determine whether the first identifier is in the selected database. The processor is further configured to restrict access of the wireless device to the wireless network based on whether the first identifier is in the selected database.

In an embodiment, the processor can be further configured to determine whether the first identifier is in the non-selected database when the first identifier is not in the selected database. The processor can be further configured to restrict access of the wireless device to the wireless network based on whether the first identifier is in the non-selected database when the first identifier is not in the selected database.

In another aspect, an access control device is provided. The access control device is configured to control access of a wireless device to a wireless network. The access control device includes a receiver configured to receive, from the wireless device, a first identifier. The first identifier includes one or more of a device identifier and a card identifier of the wireless device. The access control device further includes a processor configured to determine whether the first identifier is in a first database. The first database includes a list of device identifiers. The processor is further configured to determine whether the first identifier is in a second database when the first identifier is not in the first database. The second database includes a list of card identifiers. The processor is further configured to restrict access of the wireless device to the wireless network based on whether the first identifier is in either the first database or the second database.

In another aspect, a method of controlling access of a wireless device to a wireless network is provided. The method includes receiving, from the wireless device, a first identifier. The first identifier has an identifier type. The method further includes selecting database, from a first database and a second database, based on the identifier type. The method further includes determining whether the first identifier is in the selected database. The method further includes restricting access of the wireless device to the wireless network based on whether the first identifier is in the selected database.

In an embodiment, the method can further include determining whether the first identifier is in the non-selected database when the first identifier is not in the selected database. The method can further include restricting access of the wireless device to the wireless network based on whether the first identifier is in the non-selected database when the first identifier is not in the selected database.

In another aspect, a method of controlling access of a wireless device to a wireless network is provided. The method includes receiving, from the wireless device, a first identifier. The first identifier includes one or more of a device identifier and a card identifier of the wireless device. The method further includes determining whether the first identifier is in a first database. The first database includes a list of device identifiers. The method further includes determining whether the first identifier is in a second database when the first identifier is not in the first database. The second database includes a list of card identifiers. The method further includes restricting access of the wireless device to the wireless network based on whether the first identifier is in either the first database or the second database.

In another aspect, an apparatus for controlling access of a wireless device to a wireless network is provided. The apparatus includes means for receiving, from the wireless device, a first identifier. The first identifier has an identifier type. The apparatus further includes means for selecting database, from a first database and a second database, based on the identifier type. The apparatus further includes means for determining whether the first identifier is in the selected database. The apparatus further includes means for restricting access of the wireless device to the wireless network based on whether the first identifier is in the selected database.

In an embodiment, the apparatus can further include means for determining whether the first identifier is in the non-selected database when the first identifier is not in the selected database. The apparatus can further include means for restricting access of the wireless device to the wireless network based on whether the first identifier is in the non-selected database when the first identifier is not in the selected database.

In another aspect, an apparatus for controlling access of a wireless device to a wireless network is provided. The apparatus includes means for receiving, from the wireless device, a first identifier. The first identifier includes one or more of a device identifier and a card identifier of the wireless device. The apparatus further includes means for determining whether the first identifier is in a first database. The first database includes a list of device identifiers. The apparatus further includes means for determining whether the first identifier is in a second database when the first identifier is not in the first database. The second database includes a list of card identifiers. The apparatus further includes means for restricting access of the wireless device to the wireless network based on whether the first identifier is in either the first database or the second database.

In another aspect, a non-transitory computer-readable medium is provided. The medium includes code that, when executed, causes an apparatus to receive, from a wireless device, a first identifier. The first identifier has an identifier type. The medium further includes code that, when executed, causes the apparatus to select a database, from a first database and a second database, based on the identifier type. The medium further includes code that, when executed, causes the apparatus to determine whether the first identifier is in the selected database. The medium further includes code that, when executed, causes the apparatus to restrict access of the wireless device to a wireless network based on whether the first identifier is in the selected database.

In an embodiment, the medium can further include code that, when executed, causes the apparatus to determine whether the first identifier is in the non-selected database when the first identifier is not in the selected database. The medium can further include code that, when executed, causes an apparatus to restrict access of the wireless device to the wireless network based on whether the first identifier is in the non-selected database when the first identifier is not in the selected database.

In another aspect, a non-transitory computer-readable medium is provided. The medium includes code that, when executed, causes an apparatus to receive, from a wireless device, a first identifier. The first identifier includes one or more of a device identifier and a card identifier of the wireless device. The medium further includes code that, when executed, causes the apparatus to determine whether the first identifier is in a first database. The first database includes a list of device identifiers. The medium further includes code that, when executed, causes the apparatus to determine whether the first identifier is in a second database when the first identifier is not in the first database. The second database includes a list of card identifiers. The medium further includes code that, when executed, causes the apparatus to restrict access of the wireless device to a wireless network based on whether the first identifier is in either the first database or the second database.

DETAILED DESCRIPTION

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for CDMA, and CDMA terminology is used in much of the description below.

Figure 1:
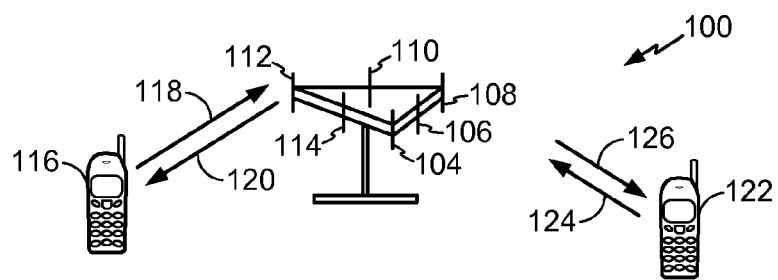
FIG. 1 illustrates an exemplary multiple access wireless communication system.

Referring to FIG. 1, a multiple access wireless communication system according to one embodiment is illustrated. An access point 100 includes multiple antenna groups, one antenna group including antennas 104 and 106, another antenna group including antennas 108 and 110, and an additional antenna group including antennas 112 and 114. In FIG. 1, only two antennas are shown for each antenna group, however, more or fewer antennas may be utilized for each antenna group. Mobile equipment (ME) 116 is in communication with antennas 112 and 114, where antennas 112 and 114 transmit information to mobile station 116 over forward link 120 and receive information from mobile station 116 over reverse link 118. The mobile station 122 is in communication with antennas 106 and 108, where antennas 106 and 108 transmit information to mobile station 122 over forward link 126 and receive information from mobile station 122 over reverse link 124. In a frequency division duplex (FDD) system, communication links 118, 120, 124 and 126 may use different frequency for communication. For example, forward link 120 may use a different frequency then that used by reverse link 118. In various embodiments, a mobile station can also be referred to as a mobile station (MS), an access terminal (AT), and/or user equipment (UE).

Each group of antennas and/or the area in which they are designed to communicate is often referred to as a sector of the access point. In the illustrated embodiment, antenna groups each are designed to communicate to mobile stations in a sector, of the areas covered by access point 100.

In communication over forward links 120 and 126, the transmitting antennas of access point 100 utilize beam-forming in order to improve the signal-to-noise ratio of forward links for the different mobile stations 116 and 124. Also, an access point using beam-forming to transmit to mobile stations scattered randomly through its coverage causes less interference to mobile stations in neighboring cells than an access point transmitting through a single antenna to all its mobile stations.

Figure 2:
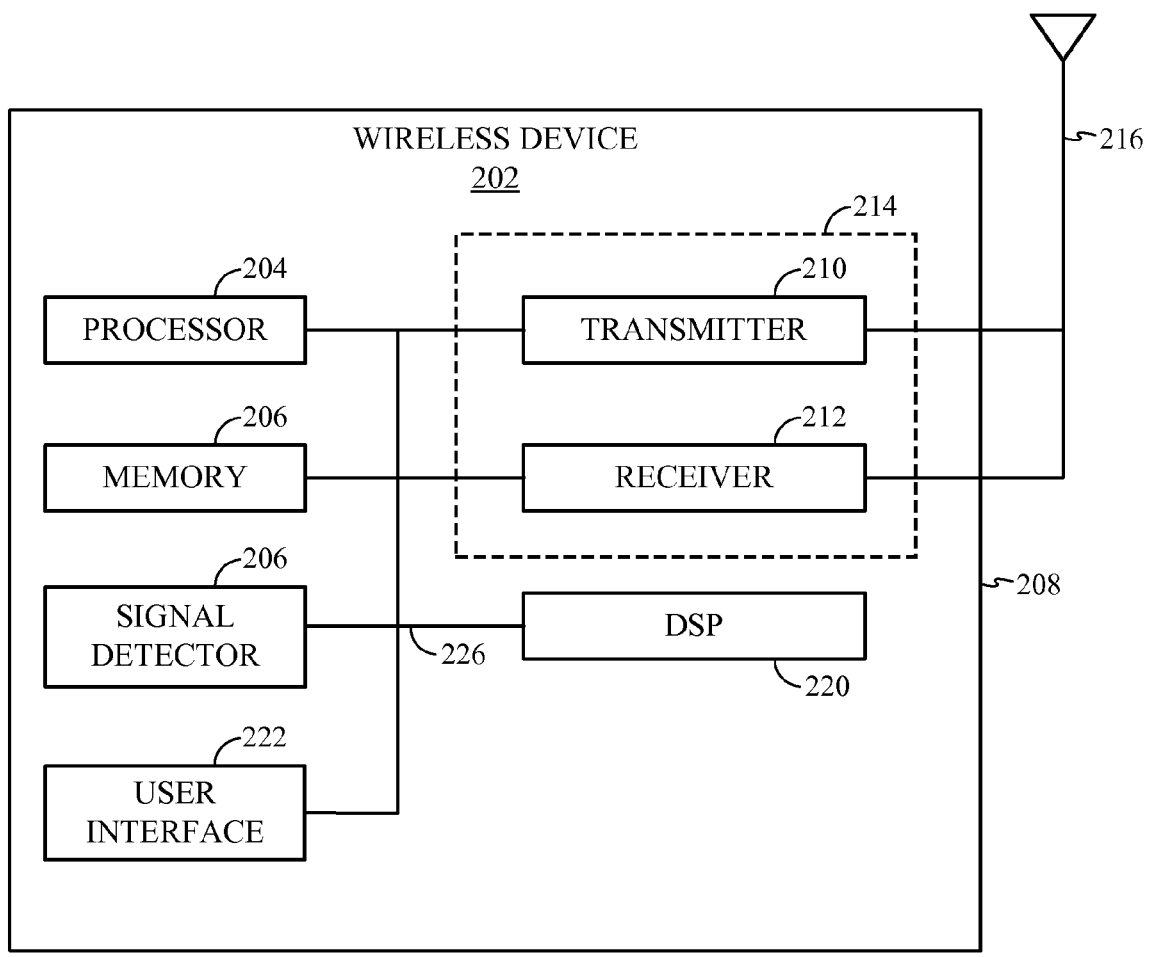
FIG. 2 illustrates a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 100 or one of the MEs 112 and 116.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

As discussed above, the wireless device 202 may comprise an AP 100 or an ME 116, and may be used to transmit and/or receive communications. For ease of reference, when the wireless device 202 is configured as an AP, it is hereinafter referred to as a wireless device 202a. Similarly, when the wireless device 202 is configured as a STA, it is hereinafter referred to as a wireless device 202m.

Figure 3:
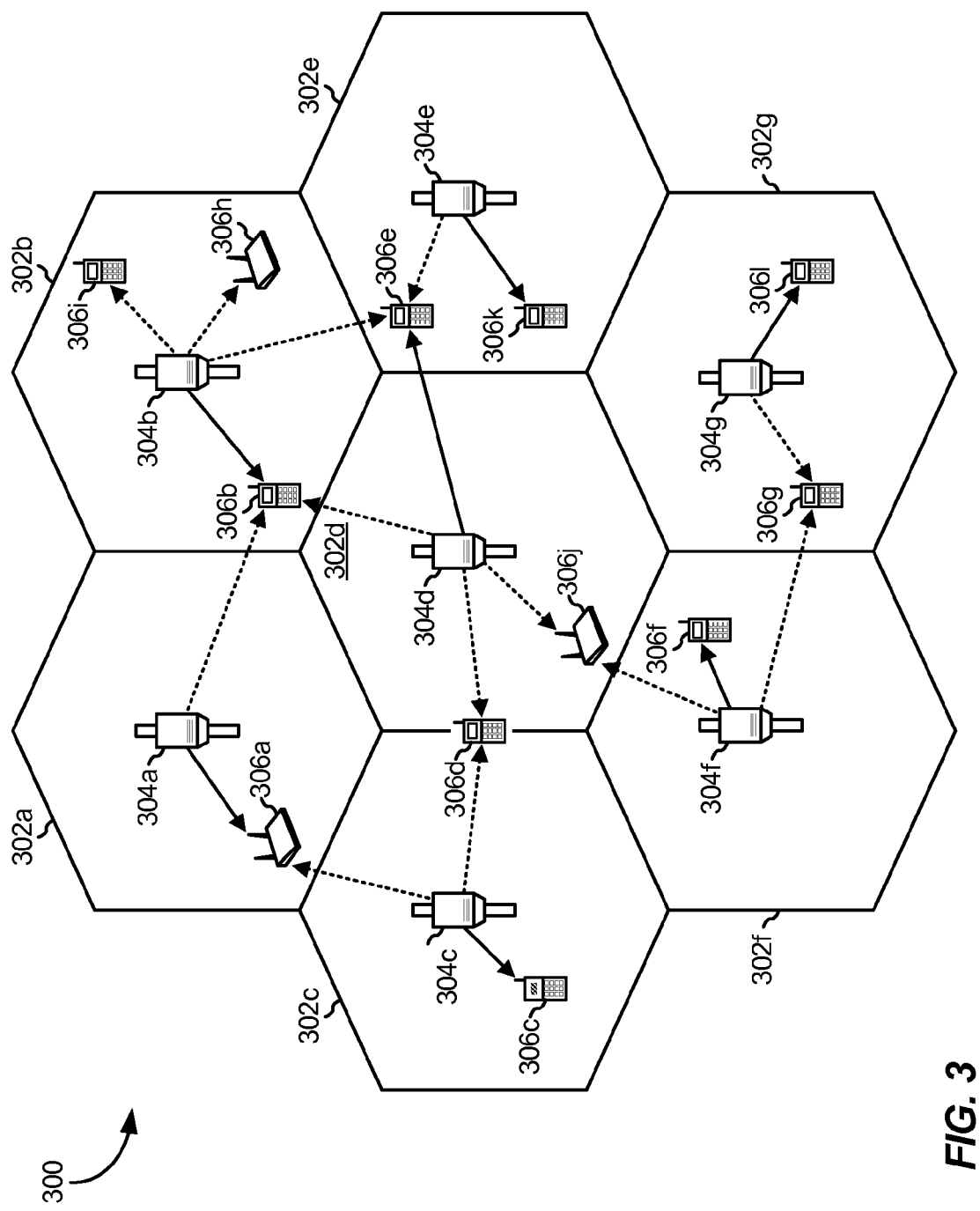
FIG. 3 illustrates an exemplary wireless communication network.

FIG. 3 illustrates an exemplary wireless communication network 300. The wireless communication network 300 is configured to support communication between multiple users. The wireless communication network 300 may be divided into one or more cells 302, such as, for example, cells 302a-302g. Communication coverage in cells 302a-302g may be provided by one or more nodes 304, such as, for example, nodes 304a-304g. Each node 304 may provide communication coverage to a corresponding cell 302. The nodes 304 may interact with a plurality of mobile stations, such as, for example, ME 306a-306l.

Each ME 306 may communicate with one or more nodes 304 on a forward link (FL) and/or a reverse link (RL) at a given moment. A FL is a communication link from a node to an ME. A RL is a communication link from an ME to a node. The nodes 304 may be interconnected, for example, by appropriate wired or wireless interfaces and may be able to communicate with each other. Accordingly, each ME 306 may communicate with another ME 306 through one or more nodes 304. For example, the ME 306*j* may communicate with the ME 306*h* as follows. The ME 306*j* may communicate with the node 304*d*. The node 304*d* may then communicate with the node 304*b*. The node 304*b* may then communicate with the ME 306*h*. Accordingly, a communication is established between the ME 306*j* and the ME 306*h*.

The wireless communication network 300 may provide service over a large geographic region. For example, the cells 302*a*-302*g* may cover only a few blocks within a neighborhood or several square miles in a rural environment. In one embodiment, each cell may be further divided into one or more sectors (not shown).

As described above, a node 304 may provide a mobile station 306 access within its coverage area to a communications network, such as, for example the internet or a cellular network.

An ME 306 may be a wireless communication device (e.g., a mobile phone, router, personal computer, server, etc.) used by a user to send and receive voice or data over a communications network. As shown, ME 306*a*, 306*h*, and 306*j* comprise routers. ME 306*b*-306*g*, 306*i*, 306*k*, and 306*l* comprise mobile phones. However, each of ME 306*a*-306*l* may comprise any suitable communication device.

Figure 4:
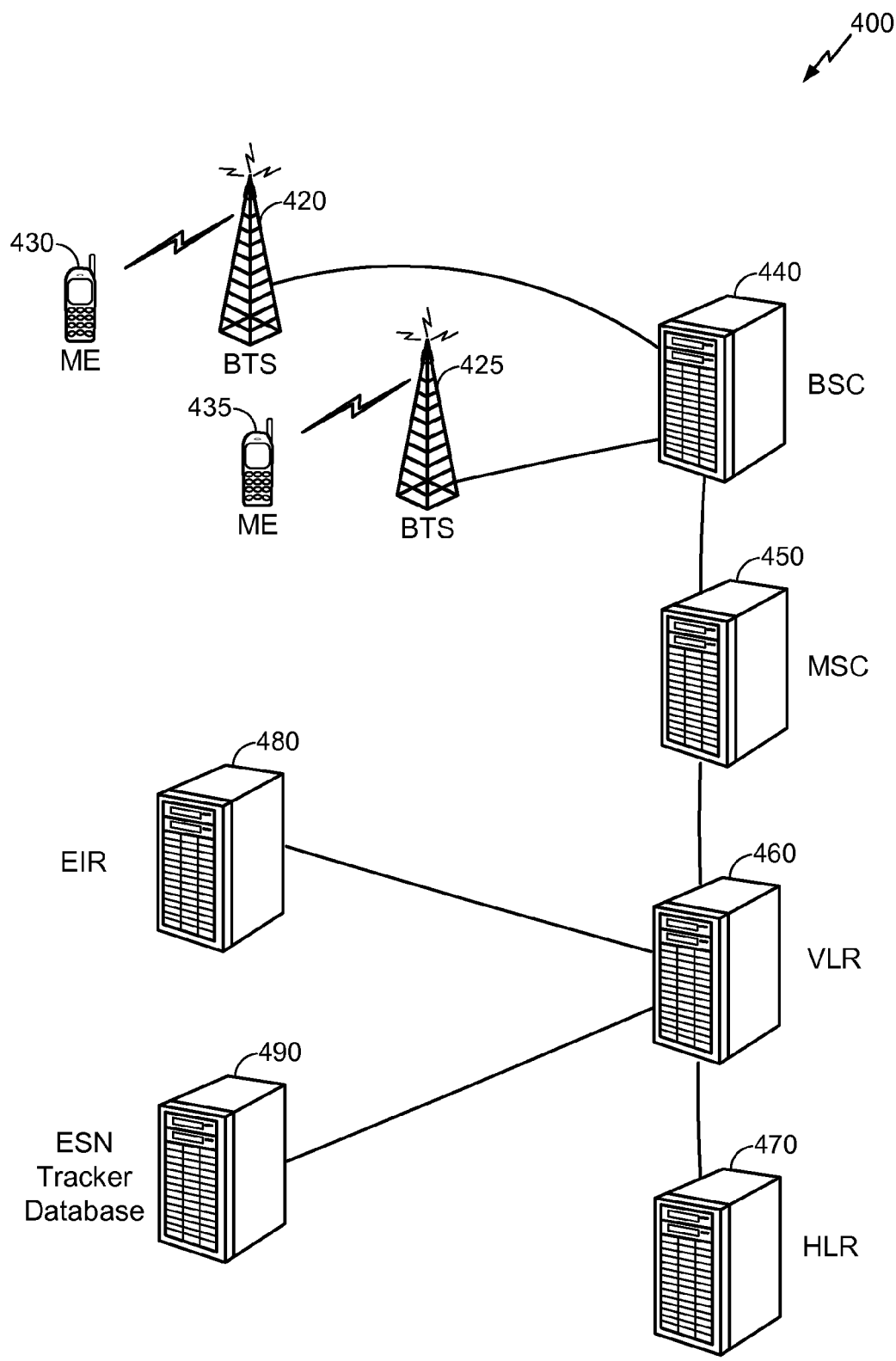
FIG. 4 illustrates another exemplary wireless communication network.

FIG. 4 illustrates another exemplary wireless communication network 400. In the illustrated embodiment, the communication network 400 may be generally similar to the communication network 300 shown in FIG. 3. The communication network 400 may be a CDMA network. The communication network 400 may comprise one or more base transceiver stations (BTSs), such as the BTS 420 and the BTS 425. The BTS 420 and the BTS 425 may communicate with one or more ME, such as the ME 430 and the ME 435, for example over an air interface. In the illustrated embodiment, the BTS 420 and 425 may be generally similar to the access point 100 shown in FIG. 1, and the ME 430 and 435 may include the wireless device 202 shown in FIG. 2.

In an embodiment, a base station controller (BSC) 440 may control the BTS 420 and 423. In some embodiments, the BSC 440 may be referred to as a radio network controller (RNC). The BSC 440 can operate with a mobile switching center (MSC) 450, which acts as a switching node for at least a portion of the communication network 400. Moreover, the MSC 450 provides the functionality for setting up a call, such as registration, authentication, location update, and call routing for the ME 430 and 435. The MSC 450 coordinates with a visitor location register (VLR) 460 and home location register (HLR) 470 to provide call-routing and roaming capabilities for the ME 430 and 435.

As discussed above, in some embodiments, the communication network 400 can use an Equipment Identity Register (EIR) 480 to determine whether a call should be granted access to the network 400. In some embodiments, GSM networks may determine whether to block the call by searching the EIR 480 for a unique identifier, for example an International Mobile Equipment Identity (IMEI). In some embodiments, CDMA phone networks may not include an equivalent mechanism.

Moreover, CDMA user equipment can use a variety of different identifier types, including device identifiers and card/subscription identifiers. Device identifiers may uniquely identify mobile devices, and may include Electronic Serial Numbers (ESNs) and/or Mobile Equipment Identifiers (MEIDs). In an embodiment, an ESN may be a unique identifier for an ESN-only device, and may not be a unique identifier when the device uses an expanded identifier, such as an MEID. Accordingly, ESNs may uniquely identify ESN-only devices, and MEIDs may uniquely identify MEID-capable devices. In an embodiment, the ESNs can be 32-bits long. In an embodiment, the MEID can be 56-bits long.

Card identifiers (or subscription identifiers) may uniquely identify subscription cards, such as Removable User Identity Modules (RUIMs). RUIMs may include User Identity Module Identifiers (UIMIDs) and/or Expanded UIMIDs (EUIMIDs) including Short Form UIMIDs (SF_UIMIDs) and Long Form UIMIDs (LF_UIMIDs). In an embodiment, the RUIMs can be 32-bits long. In another embodiment, the RUIMs can be 56-bits long.

CDMA devices may be limited to providing only one of the device identifier and the card identifier when accessing the network. In an embodiment, the ME 430 may include a preset parameter that indicates which identifier type the ME 430 should send in response to queries. For example, the ME 430 may include a usage indicator (USGIND) specifying whether the ME 430 will send a device identifier or a card identifier in response to queries. In an embodiment, the USGIND may include at least two bits. A first bit may indicate whether the ME 430 should send an ESN or an RUIMID. Specifically, in an embodiment, the first bit can indicate whether the ME 430 will use the ESN or RUIMID for CAVE authentication and identification. A second bit may indicate whether the ME 430 should send an MEID or an SF_EUIMID. Specifically, in an embodiment, the second bit can indicate whether the ME 430 will use the MEID or SF_EUIMID for device identification. In another embodiment, the preset parameter can be encoded differently. The VLR 460 may not be able to ascertain how the preset parameter is set. Accordingly, the VLR 460 may not be able to determine whether it has received a device identifier or a card identifier.

In the illustrated embodiment, the communication network 400 can include the EIR 480. The EIR can be a database that stores a list of device identifiers (e.g., ESNs and MEIDs) and information about whether those devices should be blocked. In an embodiment, however, the EIR database may not store legacy 32-bit ESNs, and may only store extended 56-bit MEIDs.

The communication network 400 can further include an ESN tracker database 490. The ESN tracker database 490 can record both device identifiers and card identifiers for user equipment, along with other information, such as software version information, hardware model information, firmware version information, etc. The information in the ESN tracker databases may be obtained from the ME 430 via query mechanism, such as a Short Message Service (SMS) query. The ESN tracker database 490 can also record subscription information of the ME 430, such as an International Mobile Subscriber Identity (IMSI). The IMSI can be obtained from the ME 430 origination message.

The ESN tracker database may store both legacy and extended device and card identifiers. In an embodiment, legacy identifiers can include ESNs and/or RUIMIDs. The legacy identifiers can be 32-bits long. In an embodiment, extended identifiers can include MEIDs, EUIMIDs (such as SF_EUIMIDs, and/or LF_EUIMIDs). The extended identifiers can be 56-bits long. The ESN tracker database may additionally store other information, such as software version information, hardware model information, firmware version information, etc. Table 1, below, shows examples of device and card identifiers, both legacy and extended.

TABLE 1

|  | Device Identifiers | Card/Subscription Identifiers |
|---|---|---|
| Legacy (32-bit) | ESN | RUIMID |
| Extended (56-bit) | MEID | SF_EUIMID |
|  |  | LF_EUIMID |

Although various devices and/or functions are depicted in FIG. 4 separately, one or more of the BSC 440, the MSC 450, the VLR 460, the HLR 470, the EIR 480, and/or the ESN tracker database 490 may be implemented on a single device, multiple devices, co-located, or otherwise integrated and/or distributed in various combinations. The BSC 440, the MSC 450, the VLR 460, the HLR 470, the EIR 480, and/or the ESN tracker database 490 may communicate with each other over wired or wireless links using any of various protocols such as, for example, Internet Protocol (IP). Although connections are shown as point-to-point, it will be understood that one or more of the BSC 440, the MSC 450, the VLR 460, the HLR 470, the EIR 480, and/or the ESN tracker database 490 may be multiply connected.

The systems and methods described herein can allow network operators, to regulate access to the communication network 400, including embodiments where the communication network 400 is a CDMA network. For example, operators can block services to blacklisted devices (such as illegitimate, fraudulent, or stolen devices), including legacy ESN-based devices. Moreover, access can be controlled based on subscriptions in addition to device identifiers with minimal changes to core network interfaces, and no changes to the air interface.

Figure 5:
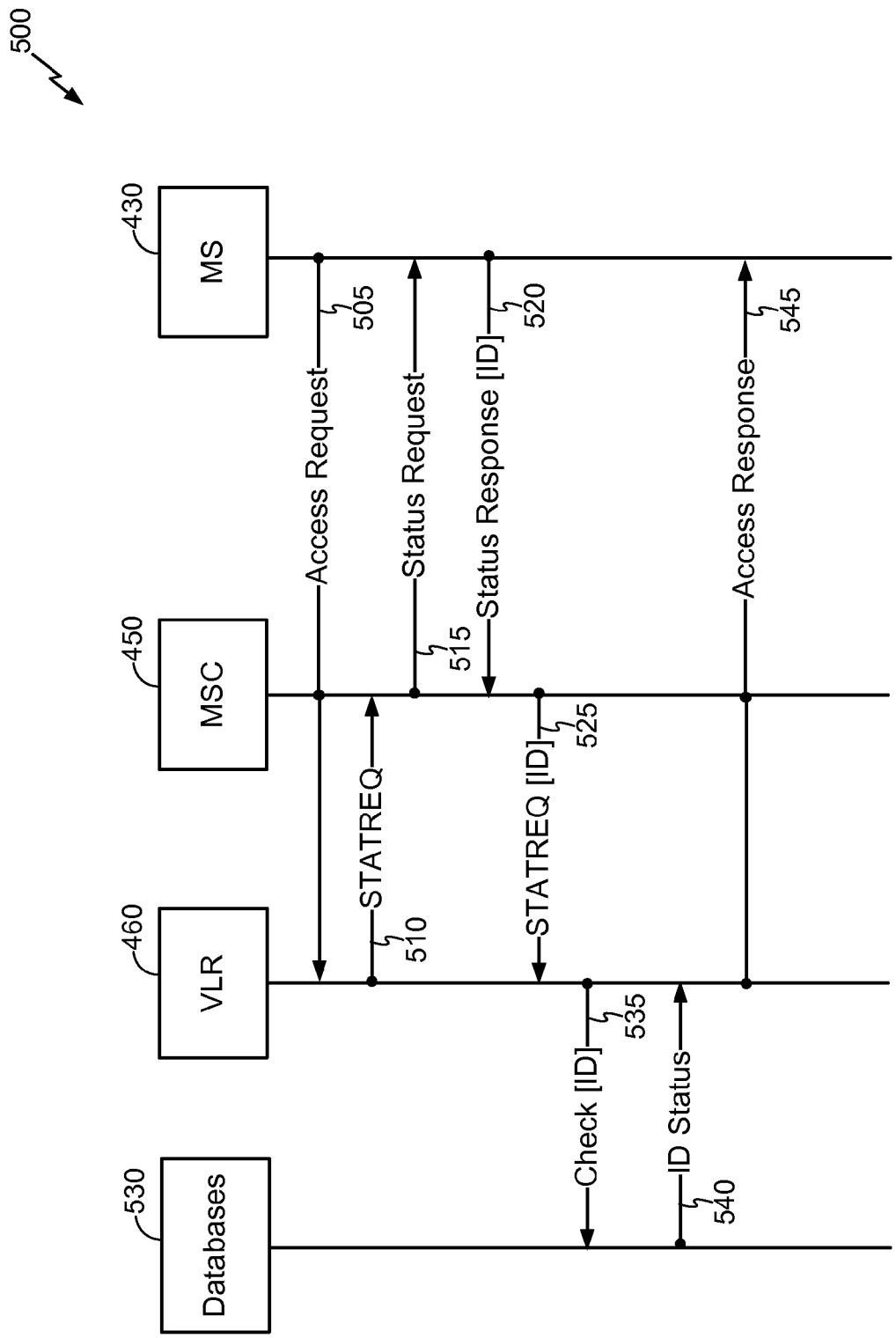
FIG. 5 illustrates an exemplary identifier assignment scheme used by a source node shown in FIG. 4.

FIG. 5 illustrates an exemplary access control sequence 500. In the illustrated embodiment, the ME 430 may attempt to connect with the communication network 400 by sending an access request 505 through the BTS 420 to the BSC 440 (FIG. 5). In an embodiment, the access request 505 may be an origination message. In an embodiment, the access request 505 may include an indication of whether the ME 430 includes legacy and/or extended identifier types. For example, the access request 505 may include a Station Class Mark (SCM). The SCM may include a bit indicating whether the ME 430 is capable of providing an extended identifier. For example, bit 4 of the SCM may indicate whether the ME 430 is capable of providing a 56-bit identifier.

The BSC 440 may forward the access request 505 to the MSC 450, which in turn can forward the access request 505 to the VLR 460. The VLR 460 may request an identifier from the ME 430. In various embodiments, the VLR 460 may request the identifier from the ME 430, or may poll the MSC for the identifier. The VLR 460 may send a status request message (STATREQ) 510 to the BSC 440, which may forward a status request message 515 to the ME 430. In an embodiment, the STATREQ 510 may include a mobile station identifier (MSID) set to identify the ME 430 to which the STATREQ 510 should be delivered. The STATREQ 510 can also include a RECORD_TYPE parameter set to request the extended or legacy identifier from the ME 430. For various reasons, however, the VLR 460 may not be able to request a specific type of identifier.

In an embodiment, the ME 430 may send one of the identifiers in Table 1 to the MSC 450 in a status response message 520. The MSC 450 may send a STATREQ 510, including the identifier and/or SCM to the VLR 460. In an embodiment, the ME 430 may not indicate to the MSC 450 which type of identifier it sent. Although the VLR 460 may ascertain whether the identifier is a legacy or extended identifier based on, for example, the SCM, it may not immediately ascertain whether the identifier is a device identifier or a card identifier.

Referring still to FIG. 5, the VLR 460 may check the identifier received from the ME 430 against one or more databases 530 by sending an identifier check 535. In various embodiments, the databases 530 can include the EIR 480 and/or the ESN tracker database 490. As will be described herein, the VLR 460 may determine which of the one or more database 530 to query, based on the identifier type and/or the results of one or more database queries.

The one or more databases 530 may respond to the identifier check 535 by sending an identifier status 540 to the VLR 460. The identifier status 540 may include access information about the ME 430. For example, the one or more databases 530 may associate identifiers with a blacklist, a whitelist, and/or a greylist. The VLR 460 may block MEs with identifiers associated with the blacklist. The VLR 460 may allow access to the network for MEs with identifiers associated with the whitelist. The VLR 460 may track, additionally scrutinize, or partially limit MEs with identifiers associated with the greylist. For example, the VLR 460 may limit the access time of the ME 430 if the databases 530 associate its identifier with a greylist. In an embodiment, the identifier status 540 may be one or more of "normal," "block," "track," or "no entry," corresponding to the whitelist, blacklist, greylist, and no matching entry found, respectively.

As will be described in greater detail herein, the VLR 460 may restrict or allow access to the ME 430 based on whether the ME 430 identifier is in the one or more databases 530. After determining whether to restrict the ME 430 from accessing the network 400, the VLR 460 can send an access response 545, through the MSC 450 and the BSC 440 (FIG. 4), to the ME 430. In an embodiment, the VLR 460 can send the access response 545 to the BSC 440, which may restrict or allow the ME 430 access to the network 400 based on the access response 545.

Figure 6:
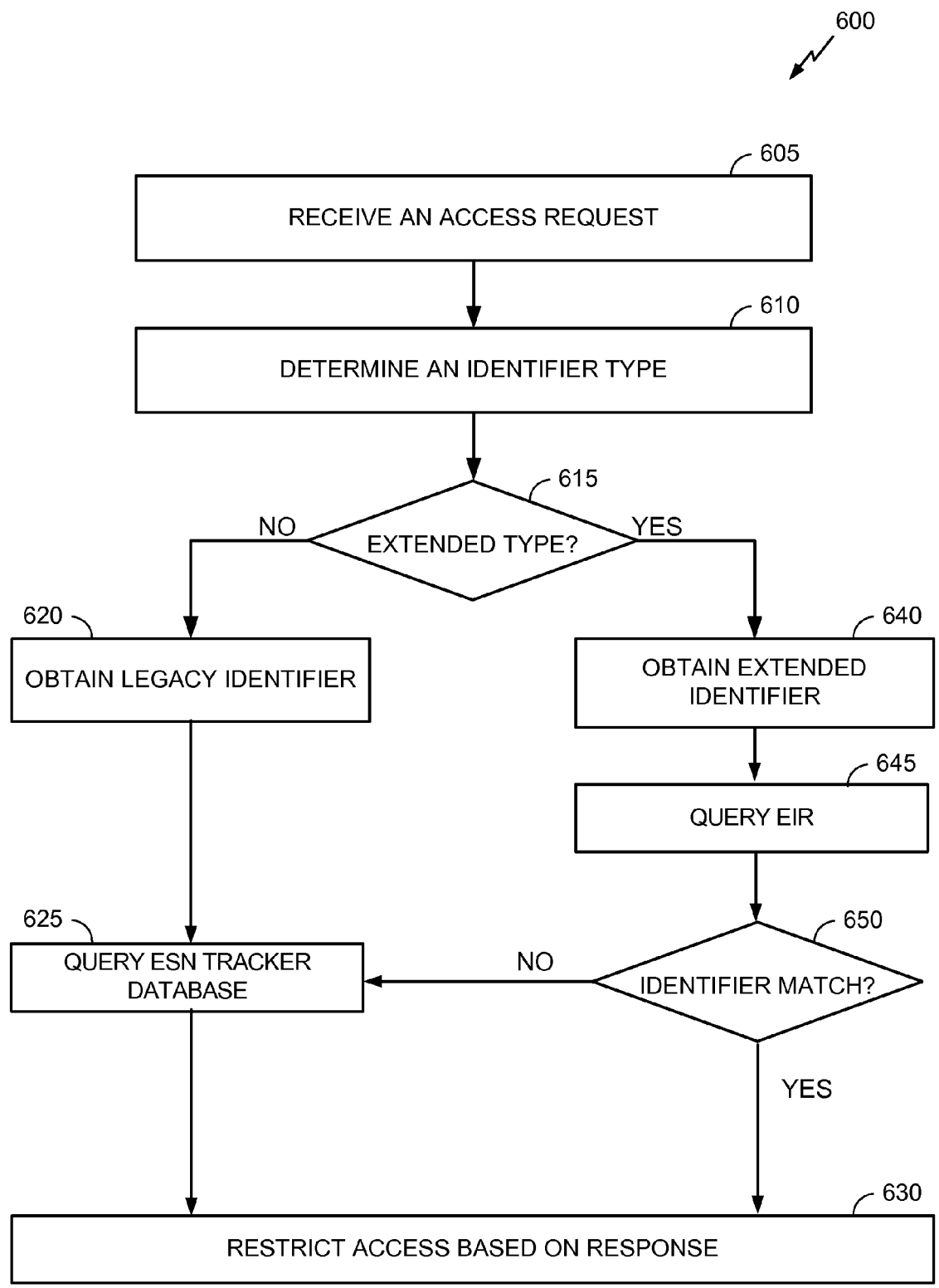
FIG. 6 illustrates an exemplary data session transfer sequence.

FIG. 6 is a flowchart of an exemplary process 600 for controlling access to the communication network 400 shown in FIG. 4. In various embodiments, the VLR 460 may perform different database queries based on whether it receives a legacy or extended identifier from the ME 430. First, at block 605, the VLR 460 receives the access request 505 from the ME 430. Next, at block 610, the VLR 460 determines whether the ME 430 is capable of providing an extended identifier. As discussed above, the VLR 460 may determine whether the ME 430 is capable of providing an extended identifier based on an indication in the access request 505, such as an SCM.

Then, at block 615, the VLR 460 performs different database queries based on whether the ME 430 is capable of providing an extended identifier. If not, the VLR 460 obtains a legacy identifier from the ME 430 at block 620. In an embodiment, for example, if the ME 430 sends an access request 505 including an SCM having bit 4 set to 0, the VLR 460 may determine that the ME 430 will not provide an extended identifier. Accordingly, the VLR 460 may poll the MSC 450 to obtain the legacy identifier from the ME 430.

Thereafter, at block 625, the VLR 460 queries the ESN tracker database 490 with the legacy identifier via the status check 535. As discussed above, the ESN tracker database 490 may return an identifier status 540 indicating a status of one or more of "normal," "block," "track," or "no entry," corresponding to the whitelist, blacklist, greylist, and no matching entry found, respectively. Subsequently, at block 630, the VLR 460 restricts access based on the identifier status 540.

For example, the VLR 460 can grant the ME 430 access to the communication network 400 when the identifier status 540 is "normal." The VLR 460 can deny the ME 430 access to the communication network 400 when the identifier status 540 is "block." The VLR 460 can grant the ME 430 limited or monitored access to the communication network 400 when the identifier status 540 is "track." The VLR 460 can deny the ME 430 access to the communication network 400 when the identifier status 540 is "no entry." In another embodiment, the VLR 460 may allow the ME 430 access to the communication network 400 when the identifier status 540 is "no entry."

Referring again to block 615, if the ME 430 is capable of providing an extended identifier, the VLR 460 obtains the extended identifier from the ME 430. In an embodiment, for example, if the ME 430 sends an access request 505 including an SCM having bit 4 set to 1, the VLR 460 may determine that the ME 430 will provide an extended identifier. Accordingly, the VLR 460 may poll the MSC 450 to obtain the extended identifier from the ME 430 at block 640.

Thereafter, at block 625, the VLR 460 queries the EIR 480 with the extended identifier via the status check 535. As discussed above, the EIR 480 may return an identifier status 540 indicating a status of one or more of "normal," "block," "track," or "no entry," corresponding to the whitelist, blacklist, greylist, and no matching entry found, respectively. Subsequently, at block 650, the VLR 460 determines whether EIR 480 found a match for the ME 430 identifier. If the EIR 480 finds a match, the VLR 460 restricts access based on the identifier status 540 at block 630, as described above.

Referring again to block 650, if the EIR 480 does not find a match for the extended identifier, the VLR 460 queries the ESN tracker database 490 at block 625, as described above. In an embodiment, the EIR 480 may not find a match for the extended identifier when the identifier type is a card identifier. For example, the EIR 480 may only store extended device identifiers. On the other hand, the ESN tracker database 490 may store additional identifiers including one or more combinations of extended, legacy, device, and/or card identifiers, in addition to other information such as device hardware and software information.

In the illustrated embodiment, when the ME 430 provides a legacy identifier (such as an ESN and/or RUIMID), the VLR 460 queries the ESN tracker database 490 and restricts access based on the identifier status 540. On the other hand, when the ME 430 provides an extended identifier (such as an MEID, SF_EUIMID, and/or LF_EUIMID), the VLR 460 first queries the EIR 480. If the EIR 480 finds a match (for example, where the extended identifier is a device identifier such as an MEID), the VLR 460 restricts access based on the identifier status 540. On the other hand, when the EIR 480 does not find a match (for example, where the extended identifier is a card identifier such as an SF_EUIMID and/or LF_EUIMID) the VLR 460 makes a second query to the ESN tracker database.

Figure 7:
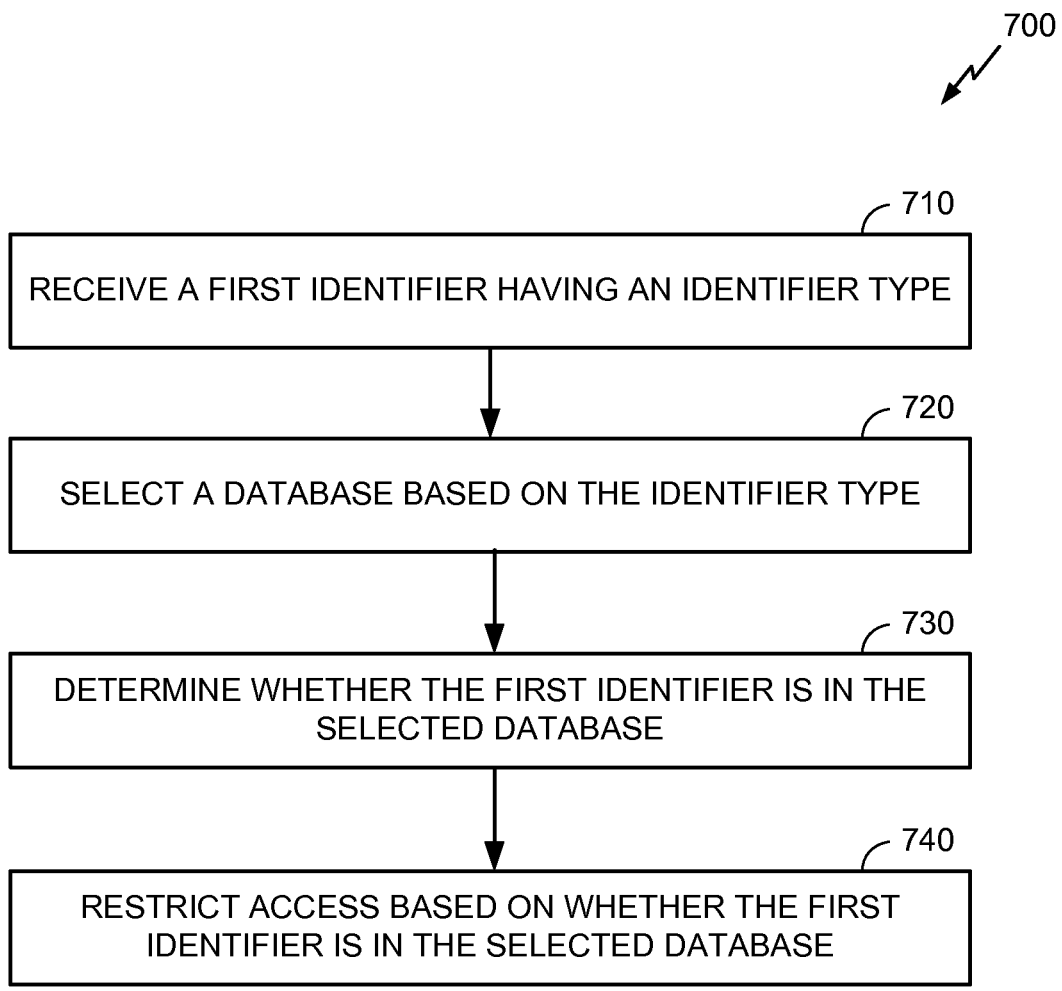
FIG. 7 shows a flowchart for an exemplary method of access control within the communication system of FIG. 4

FIG. 7 shows a flowchart for an exemplary method 700 of access control within the communication system 400 of FIG. 4. One or more of the apparatuses described herein may be configured to implement the method shown in FIG. 7. Although the method 700 is described herein with reference to the VLR 460, a person having ordinary skill in the art will appreciate that the method 700 may be implemented by and/or any other suitable device. Moreover, although the method 700 is described herein with reference to a particular order, in various embodiments, blocks herein may be performed in a different order, or omitted, and additional blocks may be added.

First, at block 710, the VLR 460 receives a first identifier having an identifier type. In an embodiment, the VLR 460 receives the first identifier from the ME 430. The first identifier can have an identifier type of extended or legacy identifier. Moreover, the first identifier can be a subscription/card identifier. In an embodiment, the VLR 460 receives the first identifier in response to a STATREQ 510.

Next, at block 720, the VLR 460 selects a database based on the identifier type. In an embodiment, the VLR 460 selects the database from a first database, which can include the EIR 480, and a second database, which can include the ESN tracker 490. In an embodiment, the first database stores extended identifiers and the second database stores legacy identifiers. For example, the first database can store at least one of MEIDs and EUIMIDs (such as SF_EUIMIDs and/or LF_EUIMIDs). The second database can store at least one of ESNs and RUIMIDs. In an embodiment, the VLR 460 selects the EIR 480 when the first identifier is an extended identifier and the VLR 460 selects the ESN tracker database 490 when the first identifier is a legacy identifier. In an embodiment, the VLR 460 determines whether the first identifier is an extended or legacy identifier based on a SCM received from the ME 430.

Then, at block 730, the VLR 460 determines whether the first identifier is in the selected database. For example, the VLR 460 can send the status check 535 to the EIR 480 or the ESN tracker database 490. The EIR 480 or the ESN tracker database 490 may respond to the identifier check 535 by sending an identifier status 540 to the VLR 460. The identifier status 540 may include access information about the ME 430. For example, the one or more databases 530 may associate identifiers with a blacklist, a whitelist, and/or a greylist. In an embodiment, the identifier status 540 may indicate that no matching entry is found, when appropriate.

Subsequently, at block 740, the VLR 460 may restrict access based on whether the first identifier is in the selected database. For example, the VLR 460 may block MEs with identifiers associated with the blacklist. The VLR 460 may allow access to the network for MEs with identifiers associated with the whitelist. The VLR 460 may track, additionally scrutinize, or partially limit MEs with identifiers associated with the greylist.

In an embodiment, if the first identifier is not in the selected database, the VLR 460 may determine whether the first identifier is in the non-selected database. For example, if the VLR 460 selects the EIR 480 because the first identifier is an extended identifier, the EIR 480 may not contain the first identifier because, for example, the first identifier may be a card identifier. Accordingly, the VLR 460 may subsequently query the ESN tracker database 490 and restrict or allow access based on the response from the ESN tracker database 490.

Figure 8:
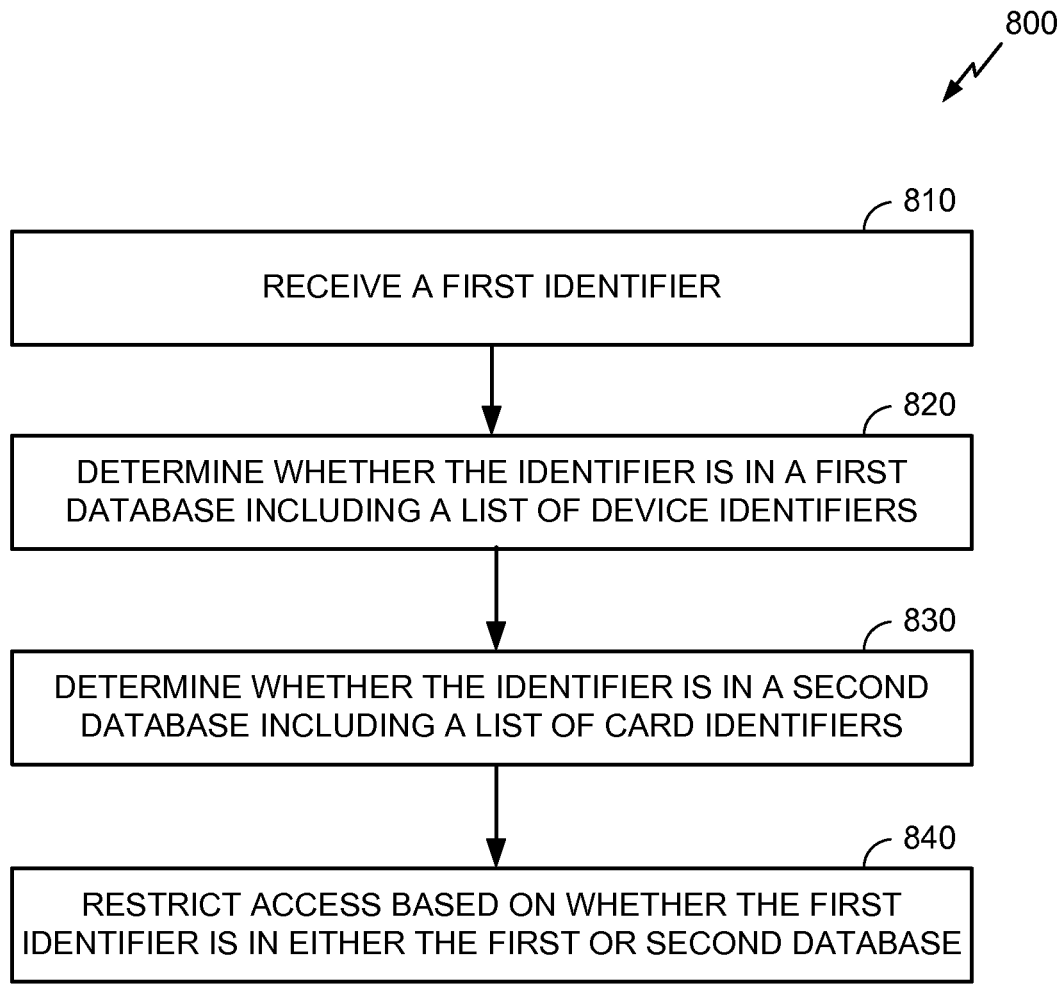
FIG. 8 shows a flowchart for an exemplary method of access control within the communication system of FIG. 4.

FIG. 8 shows a flowchart for an exemplary method 800 of access control within the communication system 400 of FIG. 4. One or more of the apparatuses described herein may be configured to implement the method shown in FIG. 8. Although the method 800 is described herein with reference to the VLR 460, a person having ordinary skill in the art will appreciate that the method 800 may be implemented by and/or any other suitable device. Moreover, although the method 800 is described herein with reference to a particular order, in various embodiments, blocks herein may be performed in a different order, or omitted, and additional blocks may be added.

First, at block 810, the VLR 460 receives a first identifier. In an embodiment, the VLR 460 receives the first identifier from the ME 430. The first identifier can have an identifier type of extended or legacy identifier. Moreover, the first identifier can be a subscription/card identifier. In an embodiment, the VLR 460 receives the first identifier in response to a STATREQ 510.

Next, at block 820, the VLR 460 determines whether the first identifier is in a first database including device identifiers. In an embodiment, the first database can be the EIR 480, which can include only extended device identifiers such as the MEID. For example, the VLR 460 can send the status check 535 to the EIR 480. The EIR 480 may respond to the identifier check 535 by sending an identifier status 540 to the VLR 460. The identifier status 540 may include access information about the ME 430. For example, the one or more databases 530 may associate identifiers with a blacklist, a whitelist, and/or a greylist.

Then, at block 830, the VLR 460 determines whether the first identifier is in a second database including card identifiers. In an embodiment, the second database can be the ESN tracker database 490, which can include many different types of identifiers, including card identifiers such as RUIMIDs, EUIMIDs, SF_EUIMIDs, LF_EUIMIDS, etc. For example, the VLR 460 can send the status check 535 to the ESN tracker database 490. The ESN tracker database 490 may respond to the identifier check 535 by sending an identifier status 540 to the VLR 460. The identifier status 540 may include access information about the ME 430. For example, the one or more databases 530 may associate identifiers with a blacklist, a whitelist, and/or a greylist. In an embodiment, the VLR 460 may only check the second database if the first identifier is not in the first database.

Subsequently, at block 840, the VLR 460 may restrict access based on whether the first identifier is in either the first or the second database. For example, the VLR 460 may block MEs with identifiers associated with the blacklist. The VLR 460 may allow access to the network for MEs with identifiers associated with the whitelist. The VLR 460 may track, additionally scrutinize, or partially limit MEs with identifiers associated with the greylist.

Figure 9:
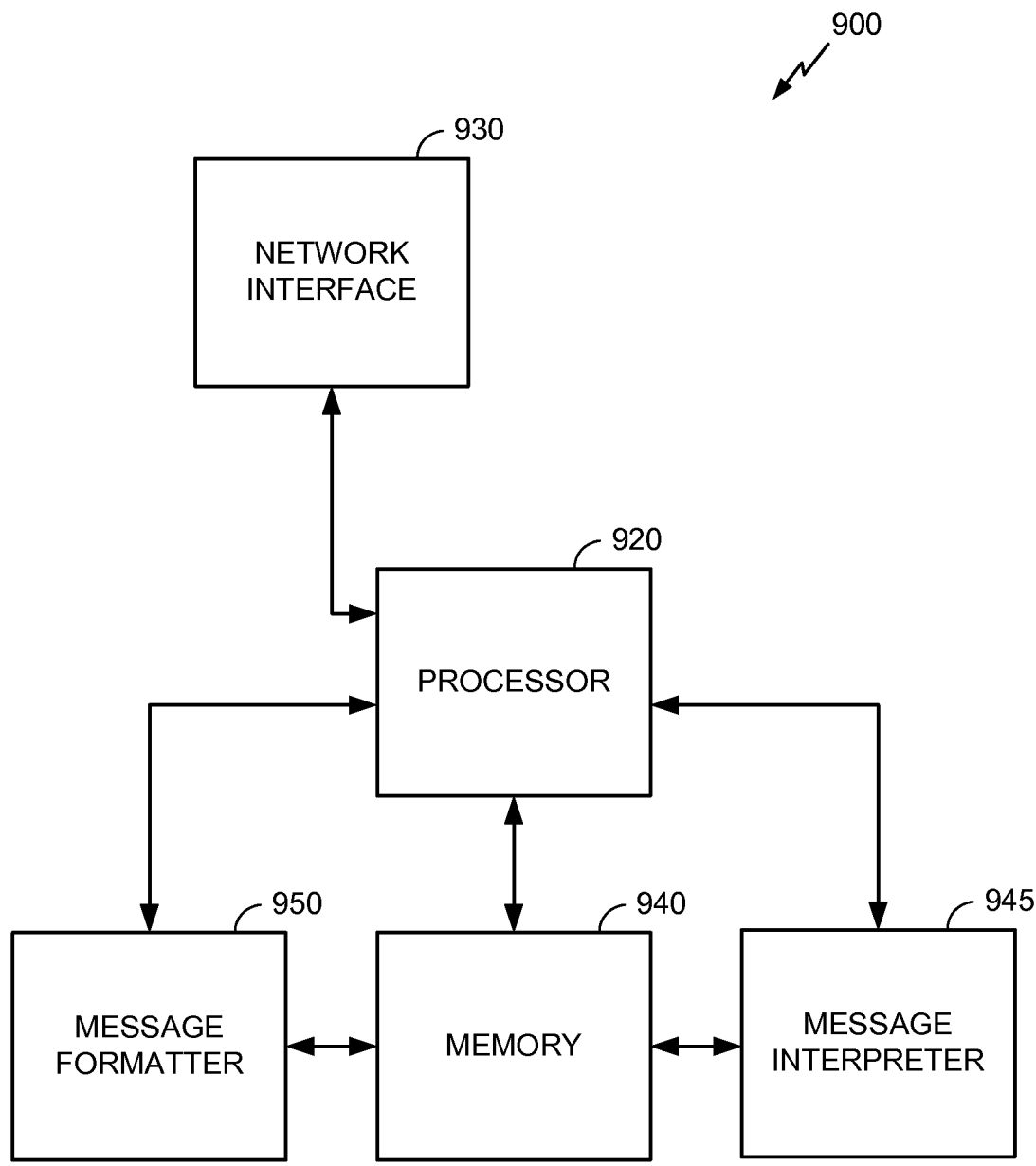
FIG. 9 is a functional block diagram of an exemplary access control device.

FIG. 9 is a functional block diagram of an exemplary access control device 900. In an embodiment, the access control device 900 can be, for example, the VLR 460 (FIG. 4). The access control device 900 can control access to the wireless network 400 as discussed above with respect to FIGS. 4-8. The access control device 900 may include a processor 920 coupled to a network interface 930. The network interface 930 may be wired or wireless, and may be configured to receive an inbound message from, and to transmit an outbound wired message to, an address. The network interface 930 can include a receiver and a transmitter. The network interface 930 may receive an inbound message and pass the inbound message to the processor 920 for processing. The processor 920 may process an outbound message and pass the outbound message to the network interface 930 for transmission to an address. For example, the network interface 930 may facilitate communication between the VLR 460 and one or more of the MSC 450, the HLR 470, the EIR 480, and the ESN tracker database 490. The processor 920 may be configured to execute one or more blocks of the methods 700 (FIG. 7) and/or 800 (FIG. 8).

The processor 920 may further be coupled, via one or more buses, to a memory 940. The processor 920 may read information from or write information to the memory 940. The memory 940 may be configured to store information for use in processing the inbound or outbound wired message. The memory 940 may also be configured to store state information such as the message type, source address, destination address, actions taken, and the like. The processor 920 may also be coupled to a message interpreter 945. The processor may pass the inbound wired message to the message interpreter 945 for processing. The message interpreter 945 may be configured to extract information from the inbound wired message received at the network interface 930. The message interpreter 945 may also be coupled directly to the memory 940 in order to store or retrieve information for use in message interpretation.

The processor 920 may also be coupled to a message formatter 950. The message formatter 950 may be configured to generate the outbound wired message. The message formatter 950 may be further configured to pass the generated outbound wired message to the processor 920. The processor 920 may pass the outbound wired message to the network interface 930 for transmission. The network interface 930 may transmit the outbound wired message to, for example, the MSC 450, the HLR 470, the EIR 480, and the ESN tracker database 490. The message formatter 950 may also be coupled directly to the memory 940 in order to store or retrieve information for use in message formatting.

The memory 940 may comprise a processor cache, including a multi-level hierarchical cache in which different levels have different capacities and access speeds. The memory 940 may also comprise random access memory (RAM), other volatile storage devices, or non-volatile storage devices. The storage may include hard drives, optical discs, such as compact discs (CDs) or digital video discs (DVDs), flash memory, floppy discs, magnetic tape, and Zip drives.

Although described separately, it is to be appreciated that functional blocks described with respect to the access control device 900 need not be separate structural elements. For example, the processor 920 and the memory 940 may be embodied in a single chip. The processor 920 may additionally, or in the alternative, contain memory, such as processor registers. Similarly, one or more of the functional blocks or portions of the functionality of various blocks may be embodied in a single chip. Alternatively, the functionality of a particular block may be implemented on two or more chips.

One or more of the functional blocks and/or one or more combinations of the functional blocks described with respect to the access control device 900, such as processor 920, message interpreter 945, and message formatter 950, may be embodied as a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. One or more of the functional blocks and/or one or more combinations of the functional blocks described with respect to the proxy 2170 may also be implemented as a combination of computing devices, e.g., a combination of a DSP and a microprocessor, a plurality of microprocessors, one or more microprocessors in conjunction with a DSP communication, or any other such configuration.

The functionality described herein (e.g., with regard to one or more of the accompanying figures) may correspond in some aspects to similarly designated "means for" functionality in the included claims.

Figure 10:
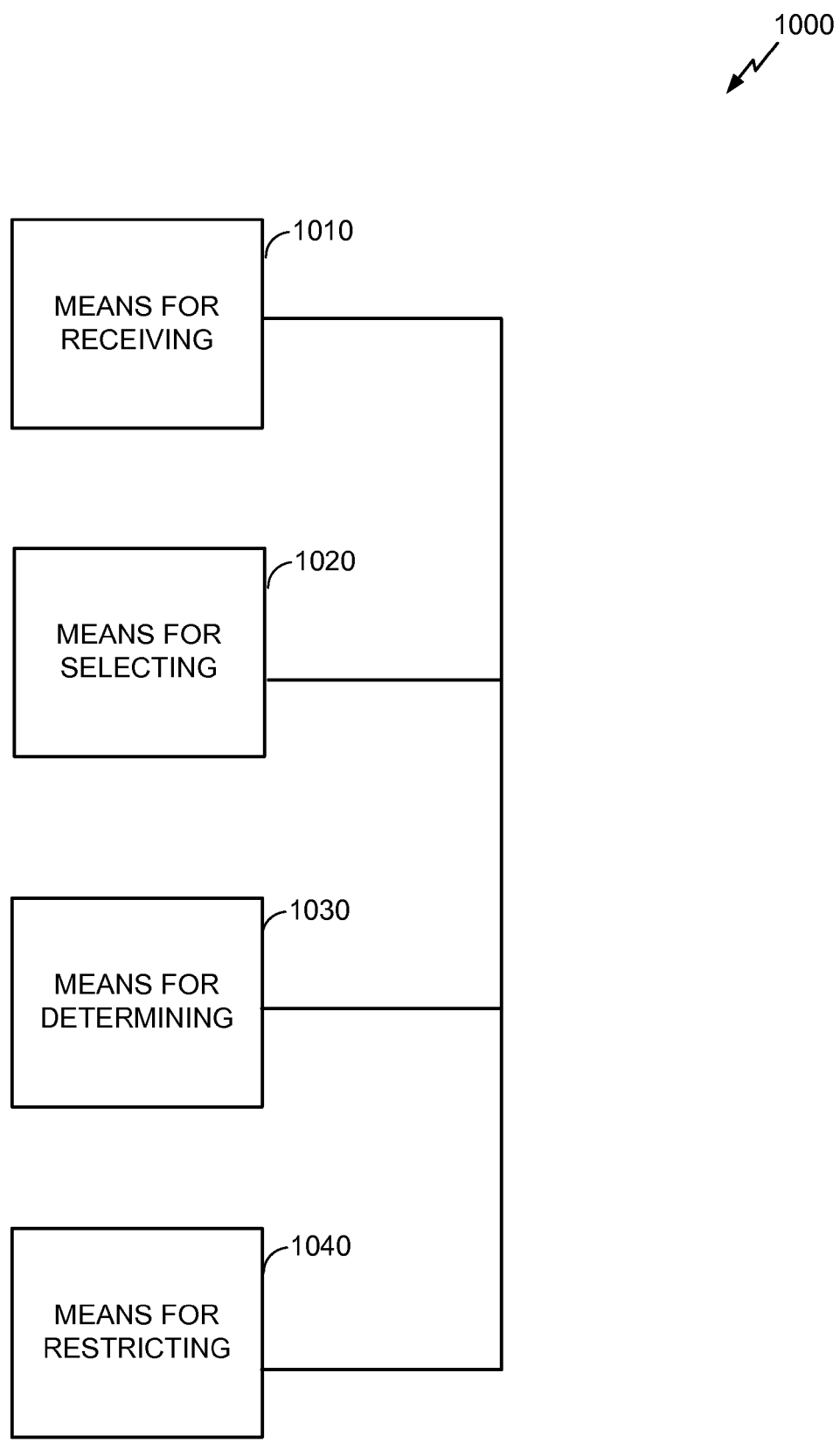
FIG. 10 shows a functional block diagram of an exemplary device that may be employed within the communication system of FIG. 4.

FIG. 10 shows a functional block diagram of an exemplary device 1000 that may be employed within the communication system 400 of FIG. 4. In the illustrated embodiment, the device 1000 includes means for receiving 1010, means for selecting 1020, means for determining 1030, and means for restricting 1040. In various embodiments, the device 1000 can be any of the devices 440-490 discussed above with respect to FIG. 4. For example, the device 1000 can be the VLR 460. A person having ordinary skill in the art will appreciate that various embodiments of the illustrated device 1000 can include additional components not shown, and can omit one or more components shown.

In the illustrated embodiment, means for receiving 1010 may be configured to perform one or more of the functions discussed above with respect to the block 710 (FIG. 7). Means for receiving 1010 may correspond to one or more of the processor 920, the network interface 930, the memory 940, and the message interpreter 945, discussed above with respect to FIG. 9. In the illustrated embodiment, means for selecting 1020 may be configured to perform one or more of the functions discussed above with respect to the block 720 (FIG. 7). Means for selecting 1020 may correspond to one or more of the processor 920 and the memory 940, discussed above with respect to FIG. 9.

In the illustrated embodiment, means for determining 1030 may be configured to perform one or more of the functions discussed above with respect to the block 730 (FIG. 7). Means for determining 1030 may correspond to one or more of the processor 920, the network interface 930, the memory 940, the message interpreter 945, and the message formatter 950, discussed above with respect to FIG. 9. In the illustrated embodiment, means for restricting 1040 may be configured to perform one or more of the functions discussed above with respect to the block 730 (FIG. 7). Means for restricting 1040 may correspond to one or more of the processor 920, the network interface 930, the memory 940, and the message formatter 950, discussed above with respect to FIG. 9.

Figure 11:
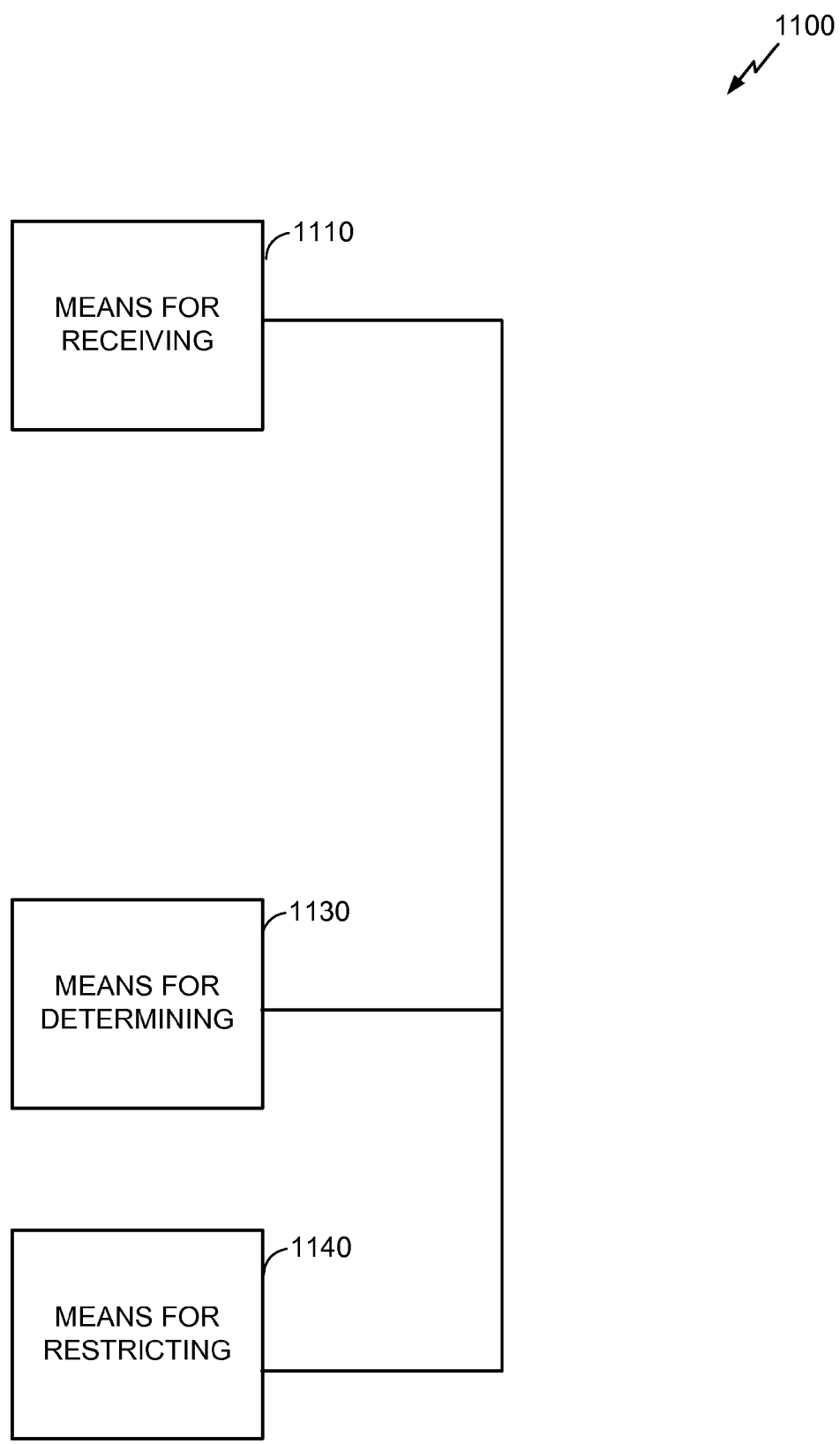
FIG. 11 shows a functional block diagram of another exemplary device that may be employed within the communication system of FIG. 4.

FIG. 11 shows a functional block diagram of another exemplary device 1100 that may be employed within the communication system 400 of FIG. 4. In the illustrated embodiment, the device 1100 includes means for receiving 1110, means for determining 1130, and means for restricting 1140. In various embodiments, the device 1100 can be any of the devices 440-490 discussed above with respect to FIG. 4. For example, the device 1100 can be the VLR 460. A person having ordinary skill in the art will appreciate that various embodiments of the illustrated device 1100 can include additional components not shown, and can omit one or more components shown.

In the illustrated embodiment, means for receiving 1110 may be configured to perform one or more of the functions discussed above with respect to the block 810 (FIG. 8). Means for receiving 1110 may correspond to one or more of the processor 920, the network interface 930, the memory 940, and the message interpreter 945, discussed above with respect to FIG. 9. In the illustrated embodiment, means for determining 1130 may be configured to perform one or more of the functions discussed above with respect to one or more of block 820 and block 830 (FIG. 8). Means for determining 1130 may correspond to one or more of the processor 920, the network interface 930, the memory 940, the message interpreter 945, and the message formatter 950, discussed above with respect to FIG. 9. In the illustrated embodiment, means for restricting 1140 may be configured to perform one or more of the functions discussed above with respect to the block 830 (FIG. 8). Means for restricting 1140 may correspond to one or more of the processor 920, the network interface 930, the memory 940, and the message formatter 950, discussed above with respect to FIG. 9.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. by way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. An access control device configured to control access of a wireless device to a wireless network, the access control device comprising:
a receiver configured to receive, from the wireless device, a first identifier having an identifier type among a plurality of identifier types, and to receive, from the wireless device, a Station Class Mark (SCM) indicative of the identifier type of the first identifier, wherein the SCM includes a bit indicating whether the wireless device is capable of providing an extended identifier; and
a processor configured to:
select a database, from a first database and a second database, based on the identifier type;
determine whether the first identifier is in the selected database; and
restrict access of the wireless device to the wireless network based on whether the first identifier is in the selected database.

2. The access control device of claim 1, wherein the processor is further configured to:
determine whether the first identifier is in the non-selected database when the first identifier is not in the selected database; and
restrict access of the wireless device to the wireless network based on whether the first identifier is in the non-selected database when the first identifier is not in the selected database.

3. The access control device of claim 1, wherein:
the plurality of identifier types comprises a legacy identifier and an extended identifier;
the first database comprises a list of extended identifiers; and
the second database comprises a list of legacy identifiers.

4. The access control device of claim 1, wherein one of the first database and the second database comprises one or more of a blacklist, a whitelist, and a grey list.

5. The access control device of claim 1, wherein the first database comprises an Equipment Identity Register (EIR) comprising a list of 56-bit Mobile Equipment Identifiers (MEIDs).

6. The access control device of claim 1, wherein the second database comprises an Electronic Serial Number (ESN) tracker database comprising a list of 32-bit ESNs.

7. The access control device of claim 1, wherein the wireless network comprises a Code Division Multiple Access (CDMA) phone network.

8. An access control device configured to control access of a wireless device to a wireless network, the access control device comprising:
a receiver configured to receive, from the wireless device, a first identifier comprising one or more of a device identifier and a card identifier of the wireless device, wherein the receiver is further configured to receive, from the wireless device, a Station Class Mark (SCM) indicative of an identifier type of the first identifier, wherein the SCM includes a bit indicating whether the wireless device is capable of providing an extended identifier; and
a processor configured to:
determine whether the first identifier is in a first database comprising a list of device identifiers;
determine whether the first identifier is in a second database comprising a list of card identifiers when the first identifier is not in the first database; and
restrict access of the wireless device to the wireless network based on whether the first identifier is in either the first database or the second database.

9. The access control device of claim 8, wherein one of the first database and the second database comprises one or more of a blacklist, a whitelist, and a grey list.

10. The access control device of claim 8, wherein the first database comprises an Equipment Identity Register (EIR) comprising a list of 56-bit Mobile Equipment Identifiers (MEIDs).

11. The access control device of claim 8, wherein the second database comprises an Electronic Serial Number (ESN) tracker database comprising a list of 32-bit ESNs.

12. The access control device of claim 8, wherein the wireless network comprises a Code Division Multiple Access (CDMA) phone network.

13. A method of controlling access of a wireless device to a wireless network, the method comprising:
receiving, from the wireless device, a first identifier having an identifier type among a plurality of identifier types, and a Station Class Mark (SCM) indicative of the identifier type of the first identifier, wherein the SCM includes a bit indicating whether the wireless device is capable of providing an extended identifier;
selecting database, from a first database and a second database, based on the identifier type;
determining whether the first identifier is in the selected database; and
restricting access of the wireless device to the wireless network based on whether the first identifier is in the selected database.

14. The method of claim 13, further comprising:
determining whether the first identifier is in the non-selected database when the first identifier is not in the selected database; and
restricting access of the wireless device to the wireless network based on whether the first identifier is in the non-selected database when the first identifier is not in the selected database.

15. The method of claim 13, wherein:
the plurality of identifier types comprises a legacy identifier and an extended identifier;
the first database comprises a list of extended identifiers; and
the second database comprises a list of legacy identifiers.

16. The method of claim 13, wherein one of the first database and the second database comprises one or more of a blacklist, a whitelist, and a grey list.

17. The method of claim 13, wherein the first database comprises an Equipment Identity Register (EIR) comprising a list of 56-bit Mobile Equipment Identifiers (MEIDs).

18. The method of claim 13, wherein the second database comprises an Electronic Serial Number (ESN) tracker database comprising a list of 32-bit ESNs.

19. The method of claim 13, wherein the wireless network comprises a Code Division Multiple Access (CDMA) phone network.

20. A method of controlling access of a wireless device to a wireless network, the method comprising:
receiving, from the wireless device, a first identifier comprising one or more of a device identifier and a card identifier of the wireless device, wherein the receiving further comprises receiving a Station Class Mark (SCM) indicative of an identifier type of the first identifier, wherein the SCM includes a bit indicating whether the wireless device is capable of providing an extended identifier;
determining whether the first identifier is in a first database comprising a list of device identifiers;
determining whether the first identifier is in a second database comprising a list of card identifiers when the first identifier is not in the first database; and
restricting access of the wireless device to the wireless network based on whether the first identifier is in either the first database or the second database.

21. The method of claim 20, wherein one of the first database and the second database comprises one or more of a blacklist, a whitelist, and a grey list.

22. The method of claim 20, wherein the first database comprises an Equipment Identity Register (EIR) comprising a list of 56-bit Mobile Equipment Identifiers (MEIDs).

23. The method of claim 20, wherein the second database comprises an Electronic Serial Number (ESN) tracker database comprising a list of 32-bit ESNs.

24. The method of claim 20, wherein the wireless network comprises a Code Division Multiple Access (CDMA) phone network.

25. An apparatus for controlling access of a wireless device to a wireless network, the apparatus comprising:
means for receiving, from the wireless device, a first identifier having an identifier type among a plurality of identifier types, wherein the means for receiving is configured to receive a Station Class Mark (SCM) indicative of the identifier type of the first identifier, wherein the SCM includes a bit indicating whether the wireless device is capable of providing an extended identifier;
means for selecting database, from a first database and a second database, based on the identifier type;
means for determining whether the first identifier is in the selected database; and
means for restricting access of the wireless device to the wireless network based on whether the first identifier is in the selected database.

26. The apparatus of claim 25, further comprising:
means for determining whether the first identifier is in the non-selected database when the first identifier is not in the selected database; and
means for restricting access of the wireless device to the wireless network based on whether the first identifier is in the non-selected database when the first identifier is not in the selected database.

27. The apparatus of claim 25, wherein:
the plurality of identifier types comprises a legacy identifier and an extended identifier;
the first database comprises a list of extended identifiers; and
the second database comprises a list of legacy identifiers.

28. The apparatus of claim 25, wherein one of the first database and the second database comprises one or more of a blacklist, a whitelist, and a grey list.

29. The apparatus of claim 25, wherein the first database comprises an Equipment Identity Register (EIR) comprising a list of 56-bit Mobile Equipment Identifiers (MEIDs).

30. The apparatus of claim 25, wherein the second database comprises an Electronic Serial Number (ESN) tracker database comprising a list of 32-bit ESNs.

31. The apparatus of claim 25, wherein the wireless network comprises a Code Division Multiple Access (CDMA) phone network.

32. An apparatus for controlling access of a wireless device to a wireless network, the apparatus comprising:
means for receiving, from the wireless device, a first identifier comprising one or more of a device identifier and a card identifier of the wireless device, wherein the means for receiving is configured to receive a Station Class Mark (SCM) indicative of an identifier type of the first identifier, wherein the SCM includes a bit indicating whether the wireless device is capable of providing an extended identifier;
means for determining whether the first identifier is in a first database comprising a list of device identifiers;
means for determining whether the first identifier is in a second database comprising a list of card identifiers when the first identifier is not in the first database; and
means for restricting access of the wireless device to the wireless network based on whether the first identifier is in either the first database or the second database.

33. The apparatus of claim 32, wherein one of the first database and the second database comprises one or more of a blacklist, a whitelist, and a grey list.

34. The apparatus of claim 32, wherein the first database comprises an Equipment Identity Register (EIR) comprising a list of 56-bit Mobile Equipment Identifiers (MEIDs).

35. The apparatus of claim 32, wherein the second database comprises an Electronic Serial Number (ESN) tracker database comprising a list of 32-bit ESNs.

36. The apparatus of claim 32, wherein the wireless network comprises a Code Division Multiple Access (CDMA) phone network.

37. A non-transitory computer-readable medium comprising code that, when executed, causes an apparatus to:
receive, from a wireless device, a first identifier having an identifier type among a plurality of identifier types, and a Station Class Mark (SCM) indicative of the type of the first identifier, wherein the SCM includes a bit indicating whether the wireless device is capable of providing an extended identifier;
select a database, from a first database and a second database, based on the identifier type;
determine whether the first identifier is in the selected database; and
restrict access of the wireless device to a wireless network based on whether the first identifier is in the selected database.

38. The medium of claim 37, further comprising code that, when executed, causes the apparatus to:
determine whether the first identifier is in the non-selected database when the first identifier is not in the selected database; and
restrict access of the wireless device to the wireless network based on whether the first identifier is in the non-selected database when the first identifier is not in the selected database.

39. The medium of claim 37, wherein:
the plurality of identifier types comprises a legacy identifier and an extended identifier;

the first database comprises a list of extended identifiers; and the second database comprises a list of legacy identifiers.

40. The medium of claim 37, wherein one of the first database and the second database comprises one or more of a blacklist, a whitelist, and a grey list.

41. The medium of claim 37, wherein the first database comprises an Equipment Identity Register (EIR) comprising a list of 56-bit Mobile Equipment Identifiers (MEIDs).

42. The medium of claim 37, wherein the second database comprises an Electronic Serial Number (ESN) tracker database comprising a list of 32-bit ESNs.

43. The medium of claim 37, wherein the wireless network comprises a Code Division Multiple Access (CDMA) phone network.

44. A non-transitory computer-readable medium comprising code that, when executed, causes an apparatus to:

receive, from a wireless device, a first identifier comprising one or more of a device identifier and a card identifier of the wireless device, wherein the code that, when executed, causes an apparatus to receive, from a wireless device, the first identifier, further comprises code that, when executed, causes the apparatus to receive a Station Class Mark (SCM) indicative of an identifier type of the first identifier, wherein the SCM includes a bit indicating whether the wireless device is capable of providing an extended identifier;

determine whether the first identifier is in a first database comprising a list of device identifiers;

determine whether the first identifier is in a second database comprising a list of card identifiers when the first identifier is not in the first database; and restrict access of the wireless device to a wireless network based on whether the first identifier is in either the first database or the second database.

45. The medium of claim 44, wherein one of the first database and the second database comprises one or more of a blacklist, a whitelist, and a grey list.

46. The medium of claim 44, wherein the first database comprises an Equipment Identity Register (EIR) comprising a list of 56-bit Mobile Equipment Identifiers (MEIDs).

47. The medium of claim 44, wherein the second database comprises an Electronic Serial Number (ESN) tracker database comprising a list of 32-bit ESNs.

48. The medium of claim 44, wherein the wireless network comprises a Code Division Multiple Access (CDMA) phone network.

* * * * *